(12) United States Patent
Zou et al.

(10) Patent No.: US 10,411,763 B2
(45) Date of Patent: Sep. 10, 2019

(54) WIRELESS POWER TRANSMISSION DEVICE

(71) Applicant: Tyco Electronics (Shanghai) Co. Ltd., Shanghai (CN)

(72) Inventors: Li Zou, Shanghai (CN); Shaoyong Wang, Shanghai (CN); Mingjie Fan, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 27 days.

(21) Appl. No.: 15/672,726

(22) Filed: Aug. 9, 2017

(65) Prior Publication Data

US 2017/0338860 A1    Nov. 23, 2017

Related U.S. Application Data

(63) Continuation of application No. PCT/IB2016/005056, filed on Feb. 8, 2016.

(30) Foreign Application Priority Data

Feb. 9, 2015 (CN) .................. 2015 2 0093258 U

(51) Int. Cl.
*H01F 38/14* (2006.01)
*H04B 5/00* (2006.01)
*H02J 50/10* (2016.01)

(52) U.S. Cl.
CPC ............ *H04B 5/0037* (2013.01); *H02J 50/10* (2016.02)

(58) Field of Classification Search
CPC ............................ H02J 50/10; H04B 5/0037
See application file for complete search history.

(56) References Cited

U.S. PATENT DOCUMENTS 9,812,890 B1 * 11/2017 Leabman ............... H02J 7/0042
2011/0006746 A1 * 1/2011 Lu ........................... H02M 1/36
                                                                       323/288

(Continued)

FOREIGN PATENT DOCUMENTS

EP          2149960 A1      2/2010
KR     20110135149 A      12/2011
KR     20110135151 A      12/2011

OTHER PUBLICATIONS

PCT Notification, International Search Report and Written Opinion, dated Apr. 18, 2016, 11 pages.

(Continued)

*Primary Examiner* — Alfonso Perez Borroto
*Assistant Examiner* — Esayas G Yeshaw
(74) *Attorney, Agent, or Firm* — Barley Snyder

(57) ABSTRACT

A wireless power transmission device comprises a power transmitter and a power receiver. The power transmitter is adapted to convert an input DC power into an electromagnetic energy. The power transmitter includes a wave generating circuit adapted to generate a square wave control signal having a predetermined frequency and a predetermined duty cycle according to the input DC power, a switching control drive circuit configured to convert the input DC power into an alternating electrical signal according to the received square wave control signal, and a first coil coupling circuit configured to convert the alternating electrical signal from the switching control drive circuit into the electromagnetic energy and output the electromagnetic energy. The power receiver is electromagnetically coupled with the power transmitter and adapted to receive the electromagnetic energy from the power transmitter.

8 Claims, 2 Drawing Sheets

(56) References Cited

U.S. PATENT DOCUMENTS

| | | | | |
|---|---|---|---|---|
| 2011/0222315 A1* | 9/2011 | Lee | H02M 3/33569 | 363/20 |
| 2013/0051083 A1* | 2/2013 | Zhao | H02J 50/12 | 363/17 |
| 2013/0082652 A1* | 4/2013 | Jung | H02J 7/0013 | 320/108 |
| 2014/0010319 A1* | 1/2014 | Baik | H04B 7/0413 | 375/267 |
| 2014/0191568 A1* | 7/2014 | Partovi | H02J 7/025 | 307/9.1 |
| 2015/0236517 A1* | 8/2015 | Deguchi | H02J 7/025 | 307/104 |
| 2015/0239353 A1* | 8/2015 | Cregut | B60L 11/182 | 320/108 |
| 2016/0072299 A1* | 3/2016 | Huang | H02J 5/005 | 307/104 |

OTHER PUBLICATIONS

Abstract of KR20110135149, dated Dec. 16, 2011, 1 page.
Abstract of KR20110135151, dated Dec. 16, 2011, 1 page.

* cited by examiner

WIRELESS POWER TRANSMISSION DEVICE

CROSS-REFERENCE TO RELATED APPLICATIONS

This application is a continuation of PCT International Application No. PCT/IB2016/050656, filed on Feb. 8, 2016, which claims priority under 35 U.S.C. § 119 to Chinese Patent Application No. 201520093258.0, filed on Feb. 9, 2015.

FIELD OF THE INVENTION

The present invention relates to a wireless transmission device and, more particularly, to a wireless power transmission device for wirelessly transmitting electricity through an electromagnetic coupling.

BACKGROUND

Known wireless power transmission devices wirelessly transmit electricity through an electromagnetic coupling comprising a power transmitter and a power receiver. The power transmitter converts an input DC current into an electromagnetic energy and the power receiver receives the electromagnetic energy output from the power transmitter. The power receiver converts the electromagnetic energy into a predetermined voltage to be output.

In the prior art, wireless power transmission devices are generally designed in accordance with a Qi interconnection standard for wireless power transmission with short-distance and low-power. The Qi standard is mainly intended to provide convenient and universal wireless charging for mobile phones and other portable electronic devices. In wireless power transmission devices meeting the aforementioned Qi standard, circuit functions thereof are complex and specialized custom chips are required to achieve circuit control. Further, control circuit modules are large in size and circuit designs are costly. The Qi standard is consequently currently only applied to expensive electronic devices such as wireless charging applications for mobile phones.

Further, known wireless power transmission devices have an H-bridge chip design. Integration level of the circuit design is low, resulting in corresponding external logic control chips. The circuit control is also complex, and it is necessary to consider dead-zone control of an H-bridge switch. Moreover, the control circuit modules are large in size and the circuit designs are costly. Known wireless power transmission devices consequently cannot be widely used in household appliances and industrial applications.

SUMMARY

A wireless power transmission device comprises a power transmitter and a power receiver. The power transmitter is adapted to convert an input DC power into an electromagnetic energy. The power transmitter includes a wave generating circuit adapted to generate a square wave control signal having a predetermined frequency and a predetermined duty cycle according to the input DC power, a switching control drive circuit configured to convert the input DC power into an alternating electrical signal according to the received square wave control signal, and a first coil coupling circuit configured to convert the alternating electrical signal from the switching control drive circuit into the electromagnetic energy and output the electromagnetic energy. The power receiver is electromagnetically coupled with the power transmitter and adapted to receive the electromagnetic energy from the power transmitter.

BRIEF DESCRIPTION OF THE DRAWINGS

The invention will now be described by way of example with reference to the accompanying figures, of which.

DETAILED DESCRIPTION OF THE EMBODIMENTS

Figure 1:
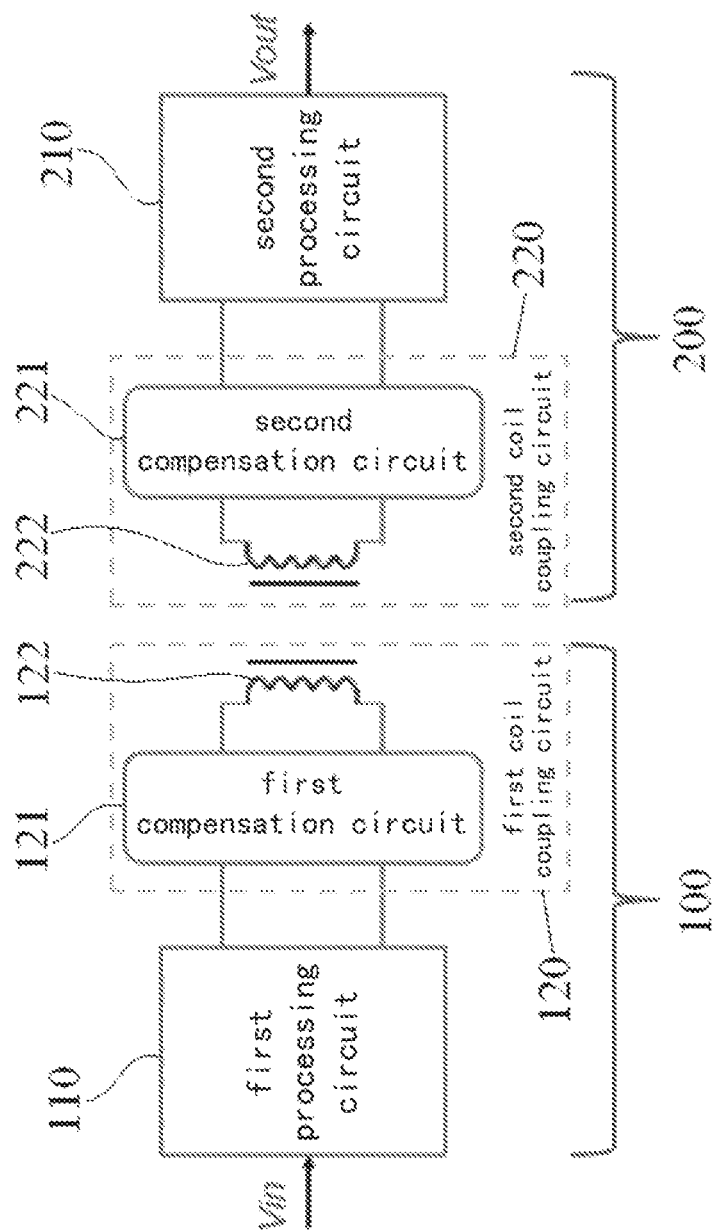
FIG. 1 is a block diagram of a wireless power transmission device according to the invention.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

A wireless power transmission device according to the invention is shown schematically in FIG. 1. The wireless power transmission device comprises a power transmitter 100 and a power receiver 200. The power transmitter 100 converts an input DC power Vin into an electromagnetic energy. The power receiver 200 is electromagnetically coupled with the power transmitter 100 and adapted to receive the electromagnetic energy from the power transmitter 100.

Figure 2:
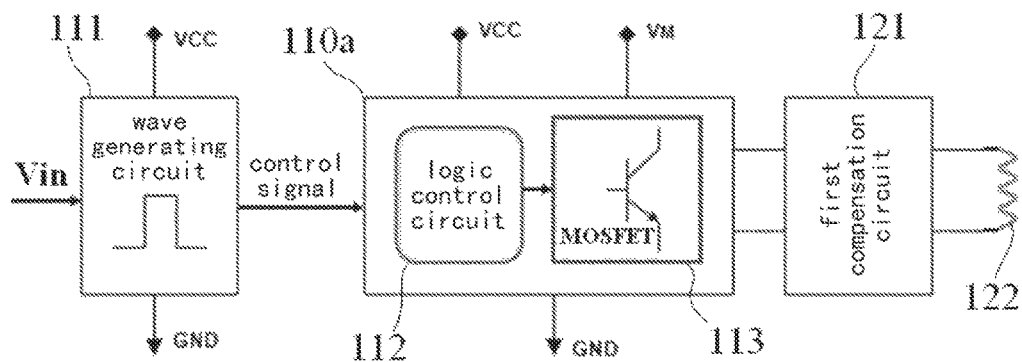
FIG. 2 is a block diagram of a power transmitter of the wireless power transmission device of FIG. 1.

The power transmitter 100 is shown schematically in FIGS. 1 and 2. The power transmitter 100 includes a first processing circuit 110 and a first coil coupling circuit 120. The first processing circuit 110 includes a wave generating circuit 111 and a switching control drive circuit 110a.

The wave generating circuit 111, as shown in FIG. 2, generates a square wave control signal having a predetermined frequency and a predetermined duty cycle according to the DC power input Vin. In an embodiment, the wave generating circuit 111 generates a PWM control signal having a predetermined frequency of 50 KHz-200 KHz and a predetermined duty cycle of 30% to 80%. A universal control chip may be used in the wave generating circuit 111 to cooperate with external devices such as a resistor and a capacitor so as to generate the control signal having the predetermined frequency and duty cycle.

The switching control drive circuit 110a, shown in FIGS. 1 and 2, is electrically connected with the wave generating circuit 111. The switching control drive circuit 110a includes a logic control circuit 112 and a MOSFET switching circuit 113. The logic control circuit 112 is electrically connected with the wave generating circuit 111 and the MOSFET switching circuit 113 is electrically connected with the logic control circuit 112. The logic control circuit 112 and MOSFET switching circuit 113 convert the received square wave control signal from the wave generating circuit 111 into an alternating electrical signal. In an embodiment, the logic control circuit 112 and the MOSFET switching circuit 113 are integrated on one single control drive chip, which not only reduces a size and cost of the control module but also solves the problem of a dead zone of the MOSFET switching circuit 113.

The first coil coupling circuit 120, as shown in FIGS. 1 and 2, includes a first compensation circuit 121 and a first coil 122. The first compensation circuit 121 is electrically connected with the switching control drive circuit 110a and converts the alternating electrical signal output from the switching control drive circuit 110a into the electromagnetic energy. The first coil 122 is electrically connected with the first compensation circuit 121 and outputs the electromagnetic energy.

Figure 3:
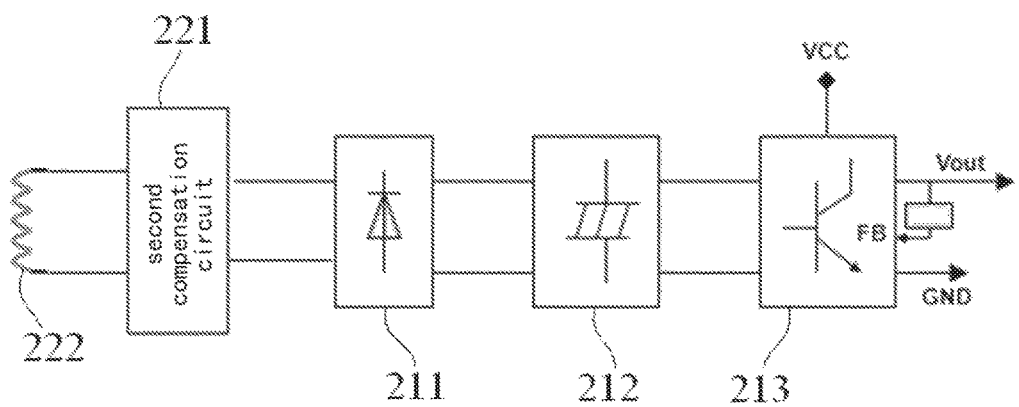
FIG. 3 is a block diagram of a power receiver of the wireless power transmission device of FIG. 1.

The power receiver 200 is shown schematically in FIGS. 1 and 3. The power receiver 200 includes a second processing circuit 210 and a second coil coupling circuit 220.

The second coil coupling circuit 220, as shown in FIGS. 1 and 3, includes a second compensation circuit 221 and a second coil 222. The second coil 222 is electromagnetically coupled with the first coil 122 and receives the electromagnetic energy output from the first coil coupling circuit 120. The second compensation circuit 221 is electrically connected with the second coil 222 and converts the received electromagnetic energy into an alternating electrical signal.

The second coil processing circuit 210, as shown in FIG. 3, includes rectifying and filtering circuits 211, 212 and a DC-DC converting circuit 213. The rectifying and filtering circuits 211, 212 are electrically connected with the second compensation circuit 221 and convert the alternating electrical signal output from the second coil coupling circuit 220 into a DC electrical signal. The rectifying and filtering circuits 211, 212 half-wave rectify the alternating electrical signal output from the second coil coupling circuit 220 through a single diode to obtain the DC electrical signal to be output. The half-wave rectification reduces power consumption of the power receiver 200, thereby improving the efficiency of the overall system.

The DC-DC converting circuit 213, as shown in FIG. 3, is electrically connected with the rectifying and filtering circuits 211, 212 and converts the DC electrical signal output from the rectifying and filtering circuits 211, 212 into a predetermined voltage output Vout (constant voltage control) or a predetermined current output (constant current control). The DC-DC converting circuit 213 includes a DC-DC converting chip and a peripheral circuit. The rectified DC electrical signal may be converted into the predetermined voltage output Vout or the set current output by adjusting ratios of resistors of the peripheral circuit.

The wireless power transmission device may be applied to a conventional closed-loop system to achieve an internal power supply signal transmission from one component to another component of an apparatus. For example, in a refrigerator application, the wireless power transmission device is installed between a body and door of the refrigerator. Through installing the power transmitter 100 on the body of the refrigerator and installing the power receiver 200 on the door of the refrigerator, it is possible to realize a non-contact power connection and signals between a main control board of the body and a control panel on the door of the refrigerator. In another embodiment, through installing the power transmitter 100 on the body of the refrigerator and installing the power receiver 200 of this wireless power transmission on shelves or drawers of the refrigerator, it is possible to realize the non-contact power supply and signal transmission between the body and the shelves or drawers of the refrigerator. The same usage may also apply to other products, such as washing machines, rice cookers and other appliances and applications known to those with ordinary skill in the art.

What is claimed is:
1. A wireless power transmission device, comprising:
a power transmitter adapted to convert an input DC power into an electromagnetic energy, the power transmitter including
a wave generating circuit adapted to generate a square wave control signal having a predetermined frequency and a predetermined duty cycle according to the input DC power;
a switching control drive circuit configured to convert the input DC power into an alternating electrical signal according to the received square wave control signal; and
a first coil coupling circuit configured to convert the alternating electrical signal from the switching control drive circuit into the electromagnetic energy and output the electromagnetic energy; and
a power receiver electromagnetically coupled with the power transmitter and adapted to receive the electromagnetic energy from the power transmitter;
wherein the power receiver includes a second coil coupling circuit electromagnetically coupled with the first coil coupling circuit and is adapted to receive the electromagnetic energy output from the first coil coupling circuit and convert the electromagnetic energy into the alternating electrical signal and a pair of rectifying and filtering circuits configured to convert the alternating electrical signal from the second coil coupling circuit into a DC electrical signal, the rectifying circuit being formed by a single diode.

2. The wireless power transmission device of claim 1, wherein the switching control drive circuit includes:
a logic control circuit electrically connected with the wave generating circuit; and
a MOSFET switching circuit electrically connected with the logic control circuit.

3. The wireless power transmission device of claim 2, wherein the logic control circuit and the MOSFET switching circuit are integrated on one chip.

4. The wireless power transmission device of claim 1, wherein the wave generating circuit is configured to generate a PWM signal having the predetermined frequency and the predetermined duty cycle.

5. The wireless power transmission device of claim 3, wherein the first coil coupling circuit includes:
a first compensation circuit electrically connected with the switching control drive circuit; and
a first coil electrically connected with the first compensation circuit.

6. The wireless power transmission device of claim 1, wherein the power receiver includes a DC-DC converting circuit configures to convert the DC electrical signal from the rectifying and filtering circuits into a predetermined voltage output or a predetermined current output.

7. The wireless power transmission device of claim 6, wherein the second coil coupling circuit includes:
a second compensation circuit electrically connected with the rectifying and filtering circuits; and
a second coil electrically connected with the second compensation circuit.

8. An apparatus, comprising:
a power transmitter installed on a first component of the apparatus and adapted to convert an input DC power into an electromagnetic energy, the power transmitter including
  a wave generating circuit adapted to generate a square wave control signal having a predetermined frequency and a predetermined duty cycle according to the input DC power;
  a switching control drive circuit configured to convert the input DC power into an alternating electrical signal according to the received square wave control signal; and
  a first coil coupling circuit configured to convert the alternating electrical signal from the switching control drive circuit into the electromagnetic energy and output the electromagnetic energy; and
a power receiver installed on a second component of the apparatus and electromagnetically coupled with the power transmitter and adapted to receive the electromagnetic energy from the power transmitter and wherein the power receiver includes a second coil coupling circuit electromagnetically coupled with the first coil coupling circuit and is adapted to receive the electromagnetic energy output from the first coil coupling circuit and convert the electromagnetic energy into the alternating electrical signal and a pair of rectifying and filtering circuits configured to convert the alternating electrical signal from the second coil coupling circuit into a DC electrical signal, the rectifying circuit is formed by a single diode.

* * * * *